(12) United States Patent
Guo et al.

(10) Patent No.: US 9,483,971 B2
(45) Date of Patent: Nov. 1, 2016

(54) DISPLAY METHOD OF DISPLAY PANEL

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Renwei Guo, Beijing (CN); Xue Dong, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 116 days.

(21) Appl. No.: 14/421,983

(22) PCT Filed: May 29, 2014

(86) PCT No.: PCT/CN2014/078779
§ 371 (c)(1),
(2) Date: Feb. 16, 2015

(87) PCT Pub. No.: WO2015/085726
PCT Pub. Date: Jun. 18, 2015

(65) Prior Publication Data
US 2016/0035263 A1  Feb. 4, 2016

(30) Foreign Application Priority Data

Dec. 13, 2013 (CN) .......................... 2013 1 0680989

(51) Int. Cl.
*G09G 3/20* (2006.01)
*G02F 1/1362* (2006.01)
*G02F 1/1335* (2006.01)

(52) U.S. Cl.
CPC ........... *G09G 3/2003* (2013.01); *G02F 1/1362* (2013.01); *G02F 1/133514* (2013.01); *G02F 2201/52* (2013.01)

(58) Field of Classification Search
None
See application file for complete search history.

(56) References Cited

U.S. PATENT DOCUMENTS 9,058,768 B2 * 6/2015 Lee ........................... G09G 3/32
2003/0016198 A1 * 1/2003 Nagai .................... G09G 1/285
345/83

(Continued)

FOREIGN PATENT DOCUMENTS

CN          101398587 A       4/2009
CN          101814511 A       8/2010

(Continued)

OTHER PUBLICATIONS

International Search Report for International Application No. PCT/CN2014/078779.

*Primary Examiner* — Xiao Wu
*Assistant Examiner* — Yu Chen
(74) *Attorney, Agent, or Firm* — Nath, Goldberg & Meyer; Joshua B. Goldberg (57) ABSTRACT

The present invention provides a display method of a display panel. The display panel in the present invention includes a plurality of repeat units each comprising a first, a second and a third color sub-pixels sequentially arranged in a row. The display method includes steps: determining a first, a second and a third color components of each repeat unit; obtaining a first and a second distribution ratios of one repeat unit respectively according to each ratio of the first color component to the second color component and of the second color component to the third color component in their respective common units; and determining respective display components of the first to the third color sub-pixels of the one repeat unit according to a total value of the first to the third color components of the one repeat unit as well as the first and the second distribution ratios.

20 Claims, 4 Drawing Sheets

(56) References Cited

U.S. PATENT DOCUMENTS

| | | | |
|---|---|---|---|
| 2006/0158466 A1* | 7/2006 | Chien | G09G 3/2074 345/694 |
| 2009/0167779 A1* | 7/2009 | Inuzuka | G09G 3/2003 345/589 |
| 2012/0001963 A1* | 1/2012 | Hinnen | H04N 9/64 345/690 |
| 2013/0229447 A1* | 9/2013 | Ihata | G09G 3/3208 345/694 |
| 2013/0242152 A1* | 9/2013 | Kasai | H04N 5/2353 348/294 |
| 2014/0092147 A1* | 4/2014 | Kimura | G09G 3/3426 345/690 |
| 2014/0125688 A1* | 5/2014 | Chen | G09G 5/02 345/589 |
| 2014/0225942 A1* | 8/2014 | Liu | G09G 3/20 345/694 |
| 2015/0015600 A1* | 1/2015 | Yang | G09G 3/2003 345/600 |
| 2015/0130964 A1* | 5/2015 | Huang | H04N 9/735 348/223.1 |

FOREIGN PATENT DOCUMENTS

| | | |
|---|---|---|
| CN | 102236179 A | 11/2011 |
| CN | 102289116 A | 12/2011 |
| CN | 102466935 A | 5/2012 |
| CN | 103165088 A | 6/2013 |
| CN | 103257494 A | 8/2013 |
| CN | 103700329 A | 4/2014 |

* cited by examiner

DISPLAY METHOD OF DISPLAY PANEL

This is a National Phase Application filed under 35 U.S.C. 371 as a national stage of PCT/CN2014/078779, filed May 29, 2014, an application claiming the benefit of Chinese Application No. 201310680989.0, filed Dec. 13, 2013, the content of each of which is hereby incorporated by reference in its entirety.

FIELD OF THE INVENTION

The present invention relates to the field of display technology, and particularly relates to a display method of a display panel.

BACKGROUND OF THE INVENTION

Figure 1:
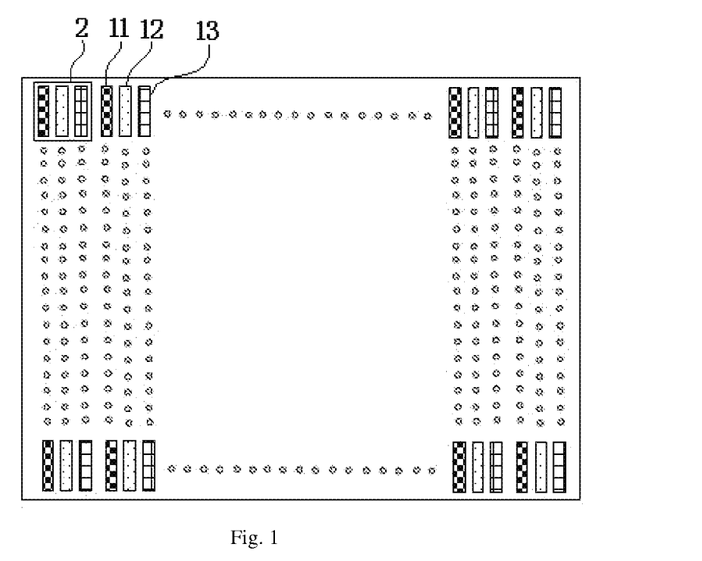
FIG. 1 is a schematic diagram of a structure of an existing display panel.

As shown in FIG. 1, in a conventional liquid crystal display device or an organic light emitting diode (OLED) display device, each point (pixel 2) displays a color by means of mixing light via a first color sub-pixel 11, a second color sub-pixel 12 and a third color sub-pixel 13. For example, each pixel 2 comprises (RGB mode) one red sub-pixel, one green sub-pixel and one blue sub-pixel. To improve the visual effect, people propose higher and higher requirements on the resolution (the number of pixels per unit size) of a display device, which requires that sizes of the sub-pixels become smaller and smaller. However, the sizes of the sub-pixels could not be unlimitedly decreased due to process limit.

In order to improve the display effect in a condition that sizes of sub-pixels are fixed, a display device of a Pentile mode has been provided. In the display device of the Pentile mode, the number of sub-pixels (such as red sub-pixels and blue sub-pixels) of some color(s) is halved; meanwhile, in the display device, different colors of sub-pixels are virtually considered as being located in different "layers", and each layer is divided into a plurality of sampling areas, and the divisions of the sampling areas of the layers are not overlapped, and then, contents to be displayed by each sub-pixel are calculated through the area ratios of the sampling areas. In the display device of the Pentile mode, a part of sub-pixels are "common", thus visually achieving a resolution higher than the actual resolution.

However, the display effect of the existing display device of the Pentile mode is still not ideal, as the number of the sub-pixels of some color(s) is halved, the sub-pixels of various colors are not evenly distributed, which leads to such problems as easy occurrence of jagged lines, grid spots, unclear display of fine contents, and the like; meanwhile, since the calculation mode based on "layer and partition" is adopted, a complicated calculation process is needed for calculating the contents to be displayed by each sub-pixel, such that the calculation amount is large.

SUMMARY OF THE INVENTION

The technical problem to be solved by the present invention is to provide a display method with high resolution, good display effect and small calculation amount, aiming at the problems of poor display effect and large calculation amount of the existing high-resolution display method.

The technical solution used for solving the technical problem of the present invention is a display method of a display panel, the display panel includes a plurality of repeat units, each of which comprises a first color sub-pixel, a second color sub-pixel and a third color sub-pixel sequentially arranged in a row, and the display method includes steps of:

S1. determining a first color component, a second color component and a third color component of each repeat unit;

S2. using a plurality of repeat units near one repeat unit as common units of the one repeat unit, obtaining a first distribution ratio of the one repeat unit according to each ratio of the first color component to the second color component in their respective common units, and obtaining a second distribution ratio of the one repeat unit according to each ratio of the second color component to the third color component in their respective common units; and S3. determining respective display components of the first color sub-pixel, the second color sub-pixel and the third color sub-pixel of the one repeat unit according to a total value of the first color component, the second color component and the third color component of the one repeat unit as well as the first distribution ratio and the second distribution ratio.

Preferably, the first color, the second color and the third color are non-repeatedly selected from red, green and blue.

Preferably, the first color component, the second color component, the third color component and the display component each are brightness.

Preferably, all sub-pixels in a same column have the same color; or the sub-pixels in the same column are the first color sub-pixels, the second color sub-pixels and the third color sub-pixels, which are alternately arranged in sequence.

Preferably, the display panel is a liquid crystal display panel or an organic light emitting diode display panel.

Preferably, the step S1 includes: determining the first color component, the second color component and the third color component of each repeat unit according to contents of an image to be displayed at different positions.

Preferably, the common units of the one repeat unit include two repeat units in the same row as and adjacent to the one repeat unit, and two repeat units respectively located in two rows adjacent to the row of the one repeat unit and being closest to the one repeat unit in the row direction.

Further preferably, the common units of the one repeat unit further include the one repeat unit itself.

Preferably, the step S2 includes: respectively calculating each ratio of the first color component to the second color component in respective one of the plurality of common units of the one repeat unit, and determining a median of the calculated ratios as the first distribution ratio; respectively calculating each ratio of the second color component to the third color component in respective one of the plurality of common units of the one repeat unit, and determining a median of the calculated ratios as the second distribution ratio.

Preferably, the step S2 includes: respectively calculating each ratio of the first color component to the second color component in respective one of the plurality of common units of the one repeat unit, and determining, as the first distribution ratio, a median of a plurality of values obtained by multiplying the calculated ratios by respective proportionality coefficients; and respectively calculating each ratio of the second color component to the third color component in respective one of the plurality of common units of the one repeat unit, and determining, as the second distribution ratio, a median of a plurality of values obtained by multiplying the calculated ratios by respective proportionality coefficients.

Preferably, the step S3 includes: distributing the total value of the first color component, the second color component and the third color component in the one repeat unit to the first color sub-pixel and the second color sub-pixel according to the first distribution ratio, so as to calculate the display component of the first color sub-pixel and a first candidate component of the second color sub-pixel; distributing the total value of the first color component, the second color component and the third color component in the one repeat unit to the second color sub-pixel and the third color sub-pixel according to the second distribution ratio, so as to calculate a second candidate component of the second color sub-pixel and the display component of the third color sub-pixel; and determining the display component of the second color sub-pixel according to the first candidate component and the second candidate component of the second color sub-pixel.

Further, preferably, determining the display component of the second color sub-pixel according to the first candidate component and the second candidate component of the second color sub-pixel includes: determining an average value of the first candidate component and the second candidate component of the second color sub-pixel as the display component of the second color sub-pixel; or determining one of the first and second candidate components of the second color sub-pixel which is closer to the second color component of the one repeat unit as the display component of the second color sub-pixel.

In the descriptions of the specification, it should be understood that, the terms "row" and "column" are defined with respect to a matrix formed by a plurality of sub-pixels, wherein the sub-pixels are arranged in a plurality of parallel straight lines (or rows) along a "row direction", and are arranged in a plurality of parallel straight lines along a "column direction", and the "row" and "column" are perpendicular to each other; thus, "row" and "column" only indicate two opposite directions and are irrespective to the shapes (rectangle, circle, polygon) of the sub-pixels, the arrangement manner of the display panel (vertical arrangement, horizontal arrangement, upright arrangement, upside down arrangement, etc.), and the arrangement manner of gate lines and data lines. For example, it may be considered that each row of sub-pixels parallel to the gate lines is a "row", and it may also be considered that each row of sub-pixels parallel to the data lines is a "row"; as another example, when the display panel is normally arranged vertically, it may be considered that each row of sub-pixels parallel to the horizon direction is a "row", and it may also be considered that each row of sub-pixels vertical to the horizon direction is a "row".

In addition, it should be understood that, "the first color sub-pixel, the second color sub-pixel and the third color sub-pixel" refer to sub-pixels of three different colors capable of displaying "a first color, a second color and a third color" respectively; in general, "the first color, the second color and the third color" should be one of three primary colors, respectively.

In addition, it should be understood that, "the first color component, the second color component and the third color component" are respectively "parameters" of three colors, namely, "the first color, the second color and the third color" at a position of a certain repeat unit according to display information. That is, the above-mentioned three "components" respectively expresses the "parameters" of the three colors which constitute the display content of the one repeat unit.

In addition, it should be understood that, "the display component" refers to "a parameter that should be displayed" by each sub-pixel after calculating with the method in the present invention, and "the display component" may be different from each one of the above-mentioned "the first color component, the second color component and the third color component".

In the display method of the present invention, the numbers of the sub-pixels of each color are the same, thus defects such as jagged lines, grid spots and the like will not occur; each repeat unit (including three sub-pixels) is divided into two parts to perform display calculation, wherein the second color sub-pixel is a common sub-pixel, i.e., three sub-pixels correspond to two "pixels", thus the resolution is visually improved; meanwhile, the display content of each sub-pixel is relevant to the contents nearby, thus transition of color thereof is smooth, as a result, the display effect is good; finally, although the "common unit" may be understood in a form of "partition", the partition is merely used for determining the common unit, whereas complicated calculations such as partition or area ratio and the like are unnecessary in actual display, thus the calculation process is simple and easy to implement.

Wherein, the reference numerals are as follows: 1. repeated unit; 11. first color sub-pixel; 12. second color sub-pixel; 13. third color sub-pixel; 2. pixel; 21. first pixel; 22. second pixel.

DETAILED DESCRIPTION OF THE EMBODIMENTS

In order that those skilled in the art can better understand the technical solutions of the present invention, a further detailed description of the present invention will be given below in combination with the accompanying drawings and specific embodiments.

First Embodiment

As shown in FIGS. 1 to 9, this embodiment provides a display method of a display panel.

Figure 2:
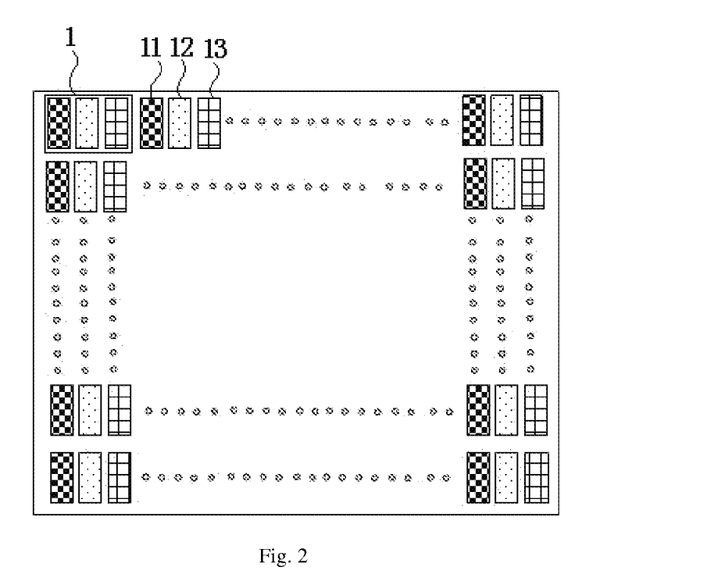
FIG. 2 is a schematic diagram of a structure of a display panel in the first embodiment of the present invention.

A display panel applicable to the method includes, as shown in FIG. 2, a plurality of repeat units 1, each of which comprises a first color sub-pixel 11, a second color sub-pixel 12 and a third color sub-pixel 13, which are sequentially arranged in a row.

The first color, the second color and the third color are preferably one of the three primary colors, respectively, thus the combination of the three colors forms a combination of the three primary colors. For example, preferably, the first color, the second color and the third color are non-repeatedly selected from red, green and blue, respectively; that is, the first color, the second color and the third color are different from each other and may be red, green and blue, respectively. Of course, the first color, the second color and the third color may also be other colors different from each other, for example, magenta, cyan, yellow, and so on.

The first color sub-pixel 11, the second color sub-pixel 12 and the third color sub-pixel 13 refer to three kinds of sub-pixels capable of displaying corresponding colors (i.e., the first color, the second color and the third color); every three sub-pixels arranged together in a preset sequence form one repeat unit 1; a plurality of repeat units 1 (or the sub-pixels in the repeat units 1) are arranged to form the display surface of the entire display panel.

Preferably, the display panel in this embodiment may be an organic light emitting diode display panel or a liquid crystal display panel. That is, the display principle of the display panel may be different, as long as the sub-pixels thereof are arranged in the above-mentioned manner. Of course, the display panel may be a known display panel of other type, such as a plasma display panel, an electrophoretic display panel or the like, which is not enumerated herein.

Preferably, all sub-pixels in the same column of the display panel have the same color. That is, as shown in FIG. 3, the repeat units 1 in the display panel are arranged in an "up-and-down aligned" manner, such that sub-pixels in any column of the display panel have the same color, namely, the display panel is arranged in a "Strip" form.

Preferably, as another manner of this embodiment, the sub-pixels in each column of the display panel are the first color sub-pixel 11, the second color sub-pixel 12 and the third color sub-pixel 13, which are alternately arranged in sequence. That is, as shown in FIG. 4, the repeat units 1 in the display panel may be arranged in such a manner that adjacent rows are "staggered" by one to two sub-pixels, such that in any column of the display panel, the sub-pixels of three different colors are alternately arranged, namely, the display panel is arranged in an "Island" form.

Figure 3:
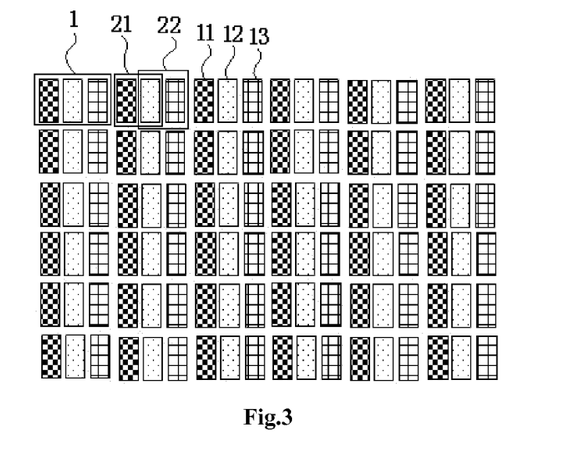
FIG. 3 is a schematic diagram of an arrangement manner for repeated units in the first embodiment of the present invention.
Figure 4:
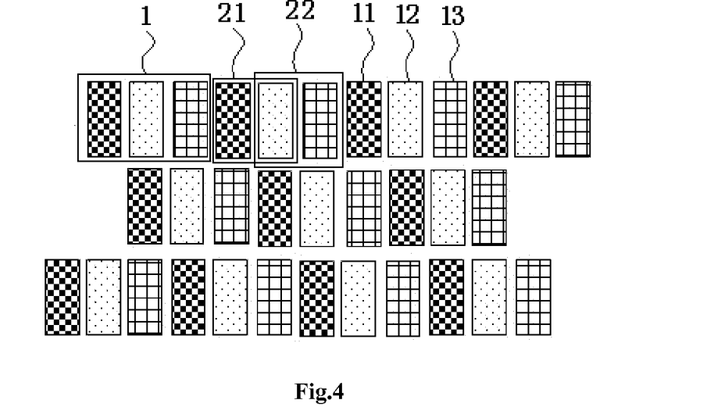
FIG. 4 is a schematic diagram of another arrangement manner for repeated units in the first embodiment of the present invention.

According to the above-mentioned arrangement manner, in each repeat unit 1, the second sub-pixel 12 (e.g. green) is necessarily located in the middle; therefore, according to the display method in this embodiment, the second sub-pixel 12 in each repeat unit 1 is a common sub-pixel, therefore, as shown in FIGS. 3 and 4, each repeat unit 1 includes a "first pixel 21" comprising the first color sub-pixel 11 and the second color sub-pixel 12 and a "second pixel 22" comprising the second color sub-pixel 12 and the third color sub-pixel 13. Namely, every three sub-pixels form two "pixels", that is, each repeat unit includes two "pixels", which share the second color sub-pixel 12. In this case, as shown in FIGS. 1 and 2, under the condition that the number of actual "pixels" is equal, in the display panel in this embodiment, each repeat unit 1 corresponds to two "pixels 2" of the existing display panel. Namely, it is equivalent to that the number of pixels per unit size of the display panel is increased, and therefore, on the premise that the sizes of the sub-pixels could not be unlimitedly decreased due to the limit of the existing process, or the sizes of the sub-pixels keep unchanged, the display device can visually achieve a higher resolution by increasing the number of pixels.

Hereinafter, the display method will be described, here, some contents are illustrated by taking an example in which the first color is red, the second color is green and the third color is blue, but obviously, the first color, the second color and the third color may also be the combination of other colors (e.g., magenta, cyan, yellow, etc.).

Specifically, the display method of the display panel in this embodiment includes steps as follows. At S01, a first color component, a second color component and a third color component of each repeat unit 1 are determined Obviously, firstly during display, content corresponding to each unit "point" on the display panel should be determined according to display information. In this step, the corresponding content is determined by using each repeat unit 1 as one unit "point", and the content comprises components of three different colors, namely, the first color component, the second color component and the third color component. That is, according to the display information, the contents (refer to contents before being calculated by the display method in this embodiment) correspondingly displayed by the first color sub-pixel 11, the second color sub-pixel 12 and the third color sub-pixel 13 in each repeat unit 1 are the first color component, the second color component and the third color component. For example, the above-mentioned three components may be respectively represented by (R1, G1, B1).

Preferably, this step specifically is: the first color component, the second color component and the third color component of each repeat unit 1 are determined according to contents of an image to be displayed at different "points".

In the display panel of this embodiment, since the "columns" of the sub-pixels become a half, namely, compared with the prior art, the ratio of "the number of rows" to "the number of columns" is doubled, when performing a display signal processing (i.e., the image to be displayed is converted into the three color components of each repeat unit 1), signals of two original adjacent "pixels 2" in the row direction are converted into a signal of one "repeat unit 1", namely, the contents of the image are laterally "compressed" to obtain the three color components (R1, G1, B1) corresponding to each "repeat unit 1". Since this conversion may be performed by using a known method, detailed description will be omitted herein.

Preferably, the first color component, the second color component, the third color component, a display component described below and the like each refer to brightness of corresponding colors. That is to say, "parameters" of various colors to be displayed may each be represented by "brightness".

Of course, as long as each "component" may represent the "parameter" corresponding to each color to be displayed, other metric parameters may also be adopted, for example, "gray level (also called as gray scale)" may be used as the "component". The "gray level" is a gradation index for display brightness in the display field, for example, for a display panel with 256 gray scales, the gray scale corresponding to the minimum brightness is 0 and the gray scale corresponding to the maximum brightness is 255. As another example, "saturation" may also be used as the "component." The "saturation" represents the degree of a color deviating from a gray color with the same brightness, namely, represents vividness.

At S02, a plurality of repeat units near the one repeat unit 1 are used as common units of the repeat unit 1, a first distribution ratio of the repeat unit 1 is calculated according to each ratio of the first color component to the second color component in their respective common units, and a second distribution ratio of the repeat unit 1 is calculated according to each ratio of the second color component to the third color component in their respective common units.

That is to say, the two "distribution ratios" of the repeat unit 1 are determined according to the "ratios" of particular color components in a plurality of repeat units near each certain repeat unit 1, thus the "distribution ratio" indicates the "proportion" of the particular colors to be displayed in the repeat unit 1.

Wherein, the "common units" near a certain repeat unit 1 refer to a plurality of repeat units close to the repeat unit 1 in position.

Figure 5:
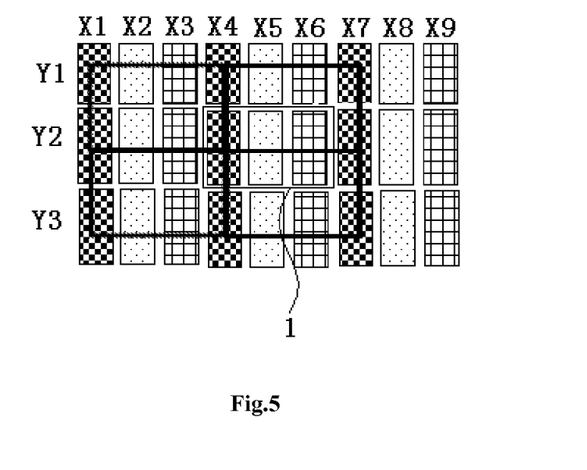
FIG. 5 is a schematic diagram of partition of a display panel in the first embodiment of the present invention.

Specifically, the common units may be divided by performing "partition" on the sub-pixels of different colors in the repeat unit 1. For example, as shown in FIG. 5, for the repeat unit 1 indicated by the fine solid line frame, the common units thereof may be determined in the following manner: performing "partition" on the first color sub-pixel 11 (red sub-pixel) in a mode indicated by the thick line frame, here, the coordinates of the first color sub-pixel 11 of the repeat unit 1 indicated by the fine solid line frame are (X4, Y2), the first color sub-pixel is divided into four parts belonging to four partitions, respectively, by the thick line frame, each area further includes parts of the other first color sub-pixels 11, and then the repeat units in which the first color sub-pixels 11 partially partitioned into these areas are located may be used as the common units of the above-mentioned repeat unit 1. Of course, similar "partition" may be performed on the sub-pixels of other colors, and the "partition" method for the sub-pixels arranged in the "island" form is similar, and is not described in detail herein.

Figure 6:
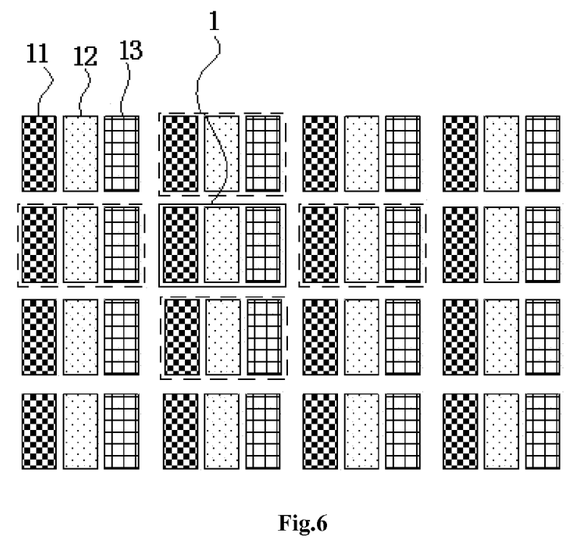
FIG. 6 is a schematic diagram of a common unit obtaining method in the first embodiment of the present invention.
Figure 7:
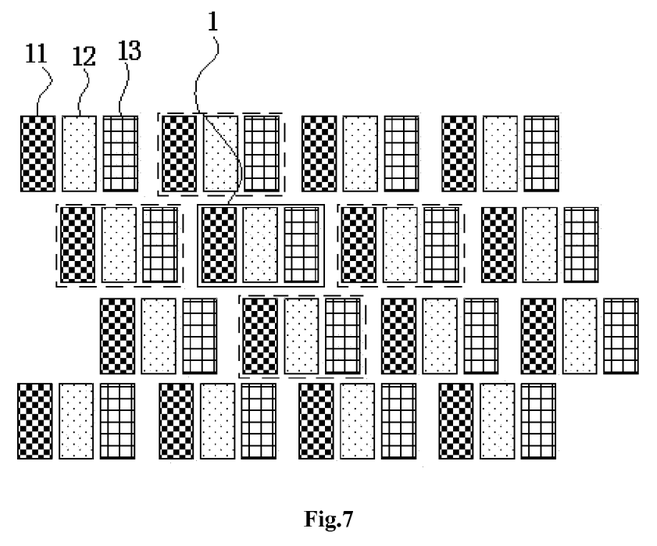
FIG. 7 is a schematic diagram of another common unit obtaining method in the first embodiment of the present invention.

Preferably, as shown in FIGS. 6 and 7, the common units of one repeat unit 1 include: two repeat units in the same row as and adjacent to the repeat unit 1, and two repeat units respectively located in two rows adjacent to the row of the repeat unit 1 and being closest to the repeat unit 1 in the row direction.

That is to say, for the repeat unit 1 indicated by the fine solid line frame in FIG. 6, the common units preferably include four repeat units indicated by dashed line frames and located at the upper, lower, left and right sides thereof. In the case of the "island" arrangement as shown in FIG. 7, the common units of the repeat unit 1 indicated by the fine solid line frame also preferably include four repeat units indicated by dashed line frames located at the upper, lower, left and right sides thereof.

Further preferably, the common units of the above-mentioned one repeat unit 1 further include the repeat unit 1 itself. That is to say, for a certain repeat unit 1, the common units thereof may further include the repeat unit 1 itself.

Of course, the selection of the above-mentioned common units is only described as a part of preferred examples and should not be regarded as a limit to the selection method, and any method used for selecting the repeat units near the repeat unit 1 is feasible. For example, for the repeat unit 1 indicated by the fine solid line frame in FIG. 6, the common units thereof may further include four repeat units located at the upper left, lower left, upper right and lower right sides thereof in addition to the four repeat units located at the upper, lower, left and right sides thereof (and itself). Of course, considering from the viewpoint of uniformity, the common units are preferably selected in a symmetrical and regular manner. Meanwhile, for the repeat units 1 located at the edge of the display panel, the specific method of selecting the common units thereof may be different from that of the repeat units 1 located in the inner part of the display panel. In short, the method of selecting the common units is diverse, thus could not be exhaustively described herein.

After determining the common units, the first distribution ratio of a certain repeat unit 1 may be calculated according to each ratio of the first color component to the second color component in respective common units of the certain repeat unit 1. In other words, the ratio of the two color components in the first pixel 21 comprising the first color sub-pixel 11 and the second color sub-pixel 12 in the certain repeat unit 1 is preferably determined by the ratio of the two color components in each of a plurality of nearby first pixels comprising the first color sub-pixel 11 and the second color sub-pixel 12 (i.e., in the common units of the certain repeat unit 1 where the first pixel 21 is located).

Preferably, the above-mentioned calculation process may be as follows: respectively calculating each ratio of the first color component to the second color component in respective one of the plurality of common units of the one repeat unit 1, and determining the median of the calculated ratios as the first distribution ratio.

That is to say, the median of the ratios is preferably used as the above-mentioned first distribution ratio. The "median" is obtained by arranging a plurality of numbers into as sequence of number in ascending or descending order, and the number located in the middle of the sequence of number is the "median", wherein the median is the number just located in the middle when the number of the numbers is odd, and the median is the average of the two numbers located in the middle when the number of the numbers is even.

Figure 8:
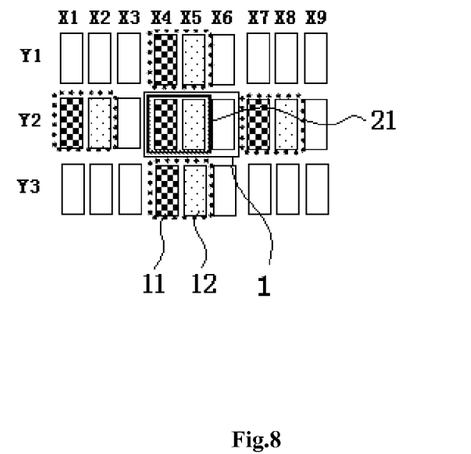
FIG. 8 is a schematic diagram of calculating a first distribution ratio in the display method in the first embodiment of the present invention.

Specifically, as shown in FIG. 8, wherein the common units of the one repeat unit 1 where the first pixel 21 indicated by the fine solid line frame is located are the four repeat units located at the upper, lower, left and right sides of the repeat unit 1, when calculating the first distribution ratio of the repeat unit 1, firstly calculate the ratio of the first color component to the second color component in each one of the surrounding first pixels indicated by the four dashed line frames (i.e., the ratio of two color components in each common unit), and then determine the median of the calculated ratios as the first distribution ratio. For example, it is assumed that the components (red brightness, i.e., R1) of four first color sub-pixels 11 with coordinates of (X4, Y1), (X1, Y2), (X4, Y3), (X7, Y2) are respectively 100 nit, 150 nit, 200 nit and 50 nit, and the components (green brightness, i.e., G1) of four second color sub-pixels 12 with coordinates of (X5, Y1), (X2, Y2), (X5, Y3), (X8, Y2) are respectively 50 nit, 200 nit, 200 nit and 100 nit. Then, the ratios of the first color components to the second color components of the four "first pixels" (or four common units) indicated by the dashed line frames are respectively 2, 0.75, 1 and 0.5; the median thereof is 0.875 (i.e., the average number of 0.75 and 1), namely, the first distribution ratio of the repeat unit 1 is 0.875. Here, "nit" is a brightness unit commonly used in the display field and indicates light emitted per unit solid angle and in the normal direction from a unit area of a light source.

Preferably, as another manner of this embodiment, the above-mentioned calculation process may also be as follows: respectively calculating each ratio of the first color component to the second color component in respective common units of the repeat unit 1, and determining, as the first distribution ratio, the median of a plurality of values obtained by multiplying the calculated ratios by respective proportionality coefficients. That is to say, after the ratios of the first color components to the second color components are calculated, the median thereof may not be directly obtained, the ratios are respectively multiplied by the respective proportionality coefficients, then, the products are sequenced and the median is obtained. Here, the "proportionality coefficient" corresponding to each ratio is a preset coefficient, which can achieve an effect of adjusting the final display content so as to achieve an optimal display effect; accordingly, the value of each "proportionality coefficient" may be set and adjusted according to the actual application environment and the optimization solution. The general determining principle of the proportionality coefficient is that the closer a common unit positioned to the repeat unit 1, the larger the "proportionality coefficient" thereof will be. Of course, the proportionality coefficient may be determined in different ways depending on the actual application environment and the optimization solution, which is not enumerated herein.

Specifically, for the condition as shown in FIG. 8, if the repeat unit 1 itself is a common unit, the ratio of the first color component to the second color component of the "first pixel 21" indicated by the solid line frame may be calculated, it is assumed that the ratio is 0.6, then the ratio is multiplied by the proportionality coefficient thereof (assumed to be 1.5) so as to obtain 0.9, and the ratios of the first color components to the second color components in the four surrounding first pixels thereof are multiplied by their respective proportionality coefficient (e.g., all are 1), then the median is taken from the five numbers, i.e., 0.9, 2, 0.75, 1 and 0.5, and as a result, the median 0.9 is determined as the first distribution ratio.

Figure 9:
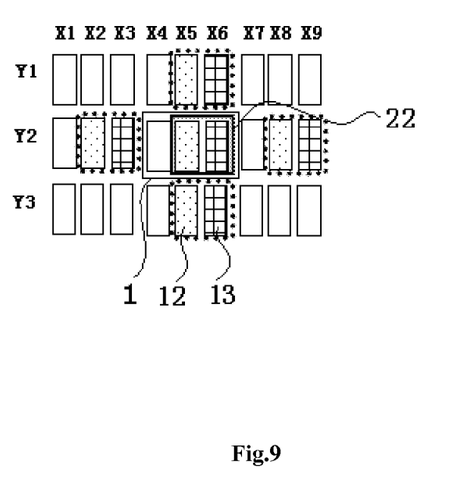
FIG. 9 is a schematic diagram of calculating a second distribution ratio in the display method in the first embodiment of the present invention.

Similarly, as shown in FIG. 9, the second distribution ratio may be calculated as follows: respectively calculating each ratio of the second color component to the third color component in each one of a plurality of common units of the one repeat unit 1, and determining the median of the calculated ratios as the second distribution ratio.

Or, the second distribution ratio may be preferably calculated as follows: respectively calculating each ratio of the second color component to the third color component in respective common units of the repeat unit 1, and determining the median of a plurality of values obtained by multiplying the calculated ratios by respective proportionality coefficients as the second distribution ratio.

That is to say, the method of calculating the second distribution ratio is similar to that of calculating the first distribution ratio, and the difference lies in that the second color component and the third color component (or the color components in a second pixel 22) are used in the calculation process; other contents similar to those in the calculation process of the first distribution ratio will not be described in detail herein.

Of course, the above description of the calculation process of the distribution ratio is only a preferred example of the calculation method, the distribution ratio may be calculated by using different methods, for example, the method of obtaining the median may be not used, but the distribution ratio is determined by a method of selecting the average value of the ratios between particular color components in the common units, and the methods of determining a proper average component to serve as the distribution ratio will not be described in detail herein.

S03. respective display components of the first color sub-pixel 11, the second color sub-pixel 12 and the third color sub-pixel 13 of the one repeat unit 1 is determined according to the total value of the first color component, the second color component and the third color component of the one repeat unit 1 as well as the first distribution ratio and the second distribution ratio.

That is to say, the total value (e.g., total brightness, i.e., value of R1+G1+B1) of the first color component, the second color component and the third color component of the one repeat unit 1 are redistributed according to the above distribution ratios, in order to calculate the display components ($R_{display}$, $G_{display}$, $B_{display}$) of contents actually displayed by the three sub-pixels in the one repeat unit 1.

Preferably, the above-mentioned calculation process may include steps as follows.

At S031, the total value of the first color component, the second color component and the third color component in the repeat unit 1 is distributed to the first color sub-pixel 11 and the second color sub-pixel 12 according to the first distribution ratio, so as to respectively obtain the display component of the first color sub-pixel 11 and a first candidate component of the second color sub-pixel 12; the total value of the first color component, the second color component and the third color component in the repeat unit 1 is distributed to the second color sub-pixel 12 and the third color sub-pixel 13 according to the second distribution ratio, so as to respectively obtain a second candidate component of the second color sub-pixel 12 and the display component of the third color sub-pixel 13.

For example, it is assumed that the first color component, the second color component and the third color component in the repeat unit 1 are respectively 100 nit, 200 nit, 150 nit (i.e., R1=100 nit, G1=200 nit, B1=150 nit), and the total value (R1+G1+B1) of the three components is 450 nit. As described above, the first distribution ratio is 0.875, that is, the brightness of the first color sub-pixel 11 and the brightness of the second color sub-pixel 12 are distributed according to the ratio of 0.875:1, thus, the brightness to be displayed by the first color sub-pixel 11 is 210nit (i.e. $R_{display}$210 nit), and meanwhile the first candidate component of the second color sub-pixel 12 is 240 nit. Similarly, the above-mentioned total brightness is distributed according to the second distribution ratio (assumed to be 1), thus the brightness to be displayed by the third color sub-pixel 13 is 225 nit (i.e. $B_{display}$225 nit), and meanwhile the second candidate component of the second sub-pixels 12 is 225 nit.

At S031, the display component of the second color sub-pixel 12 is obtained according to the first candidate component and the second candidate component of the second color sub-pixel 12.

As mentioned above, when distributing the brightness according to the first distribution ratio and the second distribution ratio, the components (i.e., $R_{display}$210 nit, $B_{display}$225 nit) of the contents to be displayed by the first color sub-pixel 11 and the third color sub-pixel 13 may be directly obtained, but the two candidate components (respectively 240 nit and 225 nit) of the second color sub-pixel 12 may be obtained at the same time, and the two candidate components are generally different. Therefore, the component of the content to be actually displayed by the second color sub-pixel 12 needs to be determined according to the two candidate components (i.e., the specific value of $G_{display}$ is determined).

Preferably, the method of obtaining the display component of the second color sub-pixel 12 according to the first candidate component and the second candidate component of the second color sub-pixel 12 may be any one of the following two methods.

In the first method, the average value of the first candidate component and the second candidate component of the second color sub-pixel 12 is determined as the display component of the second color sub-pixel 12.

That is to say, the average value (232.5 nit) of the two candidate components (240 nit and 225 nit) may be determined as the component of the content to be displayed by the second color sub-pixel 12, namely, the display component of the second color sub-pixel 12 $G_{display}$=232.5 nit.

In the second method, one of the first and second candidate components of the second color sub-pixel 12 which is closer to the second color component of the repeat unit 1 is determined as the display component of the second color sub-pixel 12.

That is to say, the two candidate components (240 nit and 225 nit) are respectively compared with the original second color component (220 nit) in the repeat unit 1, and the candidate component (225 nit) which is closer to the second color component is determined as the display component of the second color sub-pixel 12, namely, $G_{display}$=225 nit.

Of course, the above-mentioned processes of obtaining the display component of the second color sub-pixel 12 according to the two candidate components are merely a part of preferred specific examples, the display component of the second color sub-pixel 12 may also be obtained by using other methods, for example, the average value of three color components, i.e., the two candidate components and the second color component of the repeat unit 1 may be determined as the display component of the second color sub-pixel 12, which will not be described in detail herein.

S04. the display components ($R_{display}$, $G_{display}$, $B_{display}$) of the first color sub-pixel 11, the second color sub-pixel 12 and the third color sub-pixel 13 in each repeat unit 1 are determined according to the method mentioned above, that is, the display components of the contents to be displayed by all sub-pixels in the display panel are determined, and the contents are displayed according to these determined display components.

It may be understood that, the foregoing embodiments are merely exemplary embodiments used for illustrating the principle of the present invention, but the present invention is not limited hereto. Those of ordinary skill in the art may make various variations and improvements without departing from the spirit and essence of the present invention, and these variations and improvements shall fall within the protection scope of the present invention.

The invention claimed is:

1. A display method of a display panel, wherein the display panel comprises a plurality of repeat units, each of which comprises a first color sub-pixel, a second color sub-pixel and a third color sub-pixel sequentially arranged in a row, and the display method comprises steps of:
   S1. determining a first color component, a second color component and a third color component of each repeat unit;
   S2. using a plurality of repeat units near one repeat unit as common units of the one repeat unit, obtaining a first distribution ratio of the one repeat unit according to each ratio of the first color component to the second color component in their respective common units, and obtaining a second distribution ratio of the one repeat unit according to each ratio of the second color component to the third color component in their respective common units; and
   S3. determining respective display components of the first color sub-pixel, the second color sub-pixel and the third color sub-pixel of the one repeat unit according to a total value of the first color component, the second color component and the third color component of the one repeat unit as well as the first distribution ratio and the second distribution ratio.

2. The display method of claim 1, wherein
the first color, the second color and the third color are non-repeatedly selected from red, green and blue.

3. The display method of claim 1, wherein
the first color component, the second color component, the third color component and the display component each are brightness.

4. The display method of claim 1, wherein
all sub-pixels in a same column have the same color; or
the sub-pixels in the same column are the first color sub-pixels, the second color sub-pixels and the third color sub-pixels, which are alternately arranged in sequence.

5. The display method of claim 1, wherein
the display panel is a liquid crystal display panel or an organic light emitting diode display panel.

6. The display method of claim 1, wherein the step of S1 comprises:
determining the first color component, the second color component and the third color component of each repeat unit according to contents of an image to be displayed at different positions.

7. The display method of claim 2, wherein the step of S1 comprises:
determining the first color component, the second color component and the third color component of each repeat unit according to contents of an image to be displayed at different positions.

8. The display method of claim 3, wherein the step of S1 comprises:
determining the first color component, the second color component and the third color component of each repeat unit according to contents of an image to be displayed at different positions.

9. The display method of claim 1, wherein the common units of the one repeat unit comprise:
two repeat units in the same row as and adjacent to the one repeat unit, and
two repeat units respectively located in two rows adjacent to the row of the one repeat unit and being closest to the one repeat unit in the row direction.

10. The display method of claim 9, wherein
the common units of the one repeat unit further comprise: the one repeat unit itself.

11. The display method of claim 1, wherein the step of S2 comprises:
respectively calculating each ratio of the first color component to the second color component in respective one of the plurality of common units of the one repeat unit, and determining a median of the calculated ratios as the first distribution ratio; and
respectively calculating each ratio of the second color component to the third color component in respective one of the plurality of common units of the one repeat unit, and determining a median of the calculated ratios as the second distribution ratio.

12. The display method of claim 2, wherein the step of S2 comprises:
respectively calculating each ratio of the first color component to the second color component in respective one of the plurality of common units of the one repeat unit, and determining a median of the calculated ratios as the first distribution ratio; and respectively calculating each ratio of the second color component to the third color component in respective one of the plurality of common units of the one repeat unit, and determining a median of the calculated ratios as the second distribution ratio.

13. The display method of claim 3, wherein the step of S2 comprises:
respectively calculating each ratio of the first color component to the second color component in respective one of the plurality of common units of the one repeat unit, and determining a median of the calculated ratios as the first distribution ratio; and
respectively calculating each ratio of the second color component to the third color component in respective one of the plurality of common units of the one repeat unit, and determining a median of the calculated ratios as the second distribution ratio.

14. The display method of claim 1, wherein the step of S2 comprises:
respectively calculating each ratio of the first color component to the second color component in respective one of the plurality of common units of the one repeat unit, and determining, as the first distribution ratio, a median of a plurality of values obtained by multiplying the calculated ratios by respective proportionality coefficients; and
respectively calculating each ratio of the second color component to the third color component in respective one of the plurality of common units of the one repeat unit, and determining, as the second distribution ratio, a median of a plurality of values obtained by multiplying the calculated ratios by respective proportionality coefficients.

15. The display method of claim 2, wherein the step of S2 comprises:
respectively calculating each ratio of the first color component to the second color component in respective one of the plurality of common units of the one repeat unit, and determining, as the first distribution ratio, a median of a plurality of values obtained by multiplying the calculated ratios by respective proportionality coefficients; and
respectively calculating each ratio of the second color component to the third color component in respective one of the plurality of common units of the one repeat unit, and determining, as the second distribution ratio, a median of a plurality of values obtained by multiplying the calculated ratios by respective proportionality coefficients.

16. The display method of claim 3, wherein the step of S2 comprises:
respectively calculating each ratio of the first color component to the second color component in respective one of the plurality of common units of the one repeat unit, and determining, as the first distribution ratio, a median of a plurality of values obtained by multiplying the calculated ratios by respective proportionality coefficients; and
respectively calculating each ratio of the second color component to the third color component in respective one of the plurality of common units of the one repeat unit, and determining, as the second distribution ratio, a median of a plurality of values obtained by multiplying the calculated ratios by respective proportionality coefficients.

17. The display method of claim 1, wherein the step of S3 comprises:
distributing the total value of the first color component, the second color component and the third color component in the one repeat unit to the first color sub-pixel and the second color sub-pixel according to the first distribution ratio, so as to calculate the display component of the first color sub-pixel and a first candidate component of the second color sub-pixel;
distributing the total value of the first color component, the second color component and the third color component in the one repeat unit to the second color sub-pixel and the third color sub-pixel according to the second distribution ratio, so as to calculate a second candidate component of the second color sub-pixel and the display component of the third color sub-pixel; and
determining the display component of the second color sub-pixel according to the first candidate component and the second candidate component of the second color sub-pixel.

18. The display method of claim 2, wherein the step of S3 comprises:
distributing the total value of the first color component, the second color component and the third color component in the one repeat unit to the first color sub-pixel and the second color sub-pixel according to the first distribution ratio, so as to calculate the display component of the first color sub-pixel and a first candidate component of the second color sub-pixel;
distributing the total value of the first color component, the second color component and the third color component in the one repeat unit to the second color sub-pixel and the third color sub-pixel according to the second distribution ratio, so as to calculate a second candidate component of the second color sub-pixel and the display component of the third color sub-pixel; and
determining the display component of the second color sub-pixel according to the first candidate component and the second candidate component of the second color sub-pixel.

19. The display method of claim 3, wherein the step of S3 comprises:
distributing the total value of the first color component, the second color component and the third color component in the one repeat unit to the first color sub-pixel and the second color sub-pixel according to the first distribution ratio, so as to calculate the display component of the first color sub-pixel and a first candidate component of the second color sub-pixel;
distributing the total value of the first color component, the second color component and the third color component in the one repeat unit to the second color sub-pixel and the third color sub-pixel according to the second distribution ratio, so as to calculate a second candidate component of the second color sub-pixel and the display component of the third color sub-pixel; and
determining the display component of the second color sub-pixel according to the first candidate component and the second candidate component of the second color sub-pixel.

20. The display method of claim 17, wherein determining the display component of the second color sub-pixel according to the first candidate component and the second candidate component of the second color sub-pixel comprises:
determining an average value of the first candidate component and the second candidate component of the second color sub-pixel as the display component of the second color sub-pixel; or determining one of the first and second candidate component of the second color sub-pixel, which is closer to the second color component of the one repeat unit, as the display component of the second color sub-pixel.

\* \* \* \* \*